(12) United States Patent
Dalton et al.

(10) Patent No.: US 9,961,115 B2
(45) Date of Patent: May 1, 2018

(54) CLOUD-BASED ANALYTICS TO MITIGATE ABUSE FROM INTERNET TROLLS

(71) Applicant: International Business Machines Corporation, Armonk, NY (US)

(72) Inventors: Matthew D. Dalton, London (GB); James S. Luke, Cowes (GB)

(73) Assignee: International Buisness Machines Corporation, Armonk, NY (US)

( * ) Notice: Subject to any disclaimer, the term of this patent is extended or adjusted under 35 U.S.C. 154(b) by 33 days.

(21) Appl. No.: 15/267,339

(22) Filed: Sep. 16, 2016

(65) Prior Publication Data

US 2018/0084013 A1 Mar. 22, 2018

(51) Int. Cl.
*G06F 17/27* (2006.01)
*G06F 17/15* (2006.01)
*H04L 29/06* (2006.01)
*G06F 17/28* (2006.01)
*H04L 12/58* (2006.01)

(52) U.S. Cl.
CPC ............ *H04L 63/308* (2013.01); *G06F 17/28* (2013.01); *H04L 51/32* (2013.01); *H04L 63/102* (2013.01); *H04L 63/14* (2013.01); *H04L 63/1408* (2013.01); *H04L 63/302* (2013.01); *H04L 51/12* (2013.01)

(58) Field of Classification Search
CPC ... H04L 63/102; H04L 63/14; H04L 63/1408; H04L 63/1441; H04L 63/302; H04L 63/308; H04L 51/12; H04L 51/32; G06Q 50/01; G06F 17/28
See application file for complete search history.

(56) References Cited

U.S. PATENT DOCUMENTS 7,979,369 B2 * 7/2011 Grenier ............. G06F 17/30705
382/224
8,311,950 B1 * 11/2012 Kunal ................ G06Q 30/0201
705/319

(Continued)

OTHER PUBLICATIONS

Gauvin et al, "Utopia Providing Trusted Social Network Relationships within an Un-trusted Environment," International Conference on Wireless Algorithms, Systems and Applications, WASA 2009, Boston, MA, Aug. 2009, 9 pages.

(Continued)

*Primary Examiner* — Linglan Edwards
(74) *Attorney, Agent, or Firm* — VanLeeuwen & VanLeeuwen; David B. Woycechowsky

(57) ABSTRACT

An approach is provided in which an information handling system creates a first language profile corresponding to a first user account in response to determining that the first user account generated a first offensive message. The information handling system computes an accumulated risk score of the first user account based on correlating the first language profile to a second language profile corresponding to a second user account that generated a second offensive post. The accumulated risk score is based on a first risk score of the first user account and a second risk score of the second user account. In turn, the information handling system generates a notification in response to determining that the accumulated risk score reaches a risk threshold.

20 Claims, 8 Drawing Sheets

(56) References Cited

U.S. PATENT DOCUMENTS

| | | | |
|---|---|---|---|
| 8,484,730 B1* | 7/2013 | P. R. ................... G06F 11/3438 709/225 |
| 8,510,098 B2* | 8/2013 | Spears .................... G06F 17/28 704/1 |
| 9,043,398 B2 | 5/2015 | Risher et al. |
| 9,106,705 B1* | 8/2015 | Tuttle ..................... H04L 63/20 |
| 9,191,411 B2* | 11/2015 | Foster .................... H04L 63/20 |
| 9,224,390 B2 | 12/2015 | Alkov et al. |
| 2013/0124192 A1* | 5/2013 | Lindmark ............. G06F 17/274 704/9 |
| 2013/0340089 A1* | 12/2013 | Steinberg ................ H04L 63/10 726/27 |
| 2014/0156748 A1* | 6/2014 | Allen ..................... G06Q 10/10 709/204 |
| 2014/0172989 A1 | 6/2014 | Rubinstein et al. |
| 2014/0180788 A1 | 6/2014 | George et al. |
| 2014/0280236 A1* | 9/2014 | Faller ................. G06F 17/3053 707/749 |
| 2014/0280592 A1 | 9/2014 | Zafarani et al. |
| 2015/0120583 A1* | 4/2015 | Zarrella ................. G06Q 50/01 705/317 |
| 2015/0229664 A1* | 8/2015 | Hawthorn ........... H04L 63/1433 726/25 |
| 2015/0229665 A1* | 8/2015 | Foster ................ H04L 63/1433 726/22 |
| 2015/0229666 A1* | 8/2015 | Foster .................... H04L 63/14 726/22 |
| 2015/0381543 A1* | 12/2015 | Hong ...................... H04W 4/02 709/203 |
| 2016/0294755 A1* | 10/2016 | Prabhu .................... H04L 51/12 |

OTHER PUBLICATIONS

Squicciarini et al, "Online abusive users analytics through visualization," Proceedings of the 23rd International Conference on World Wide Web, WWW '14, Apr. 2014, Seoul, Korea, pp. 155-158.

Stupid Filter, StupidFilter Project, 2016, 2 pages.

Arthur, "A filter for stupidity?" The Guardian, Nov. 2007, 4 pages.

* cited by examiner

| 600 | Initial Risk Score (610) | Correlation to User ID A (620) | Accumulated Risk Score Computations Relative to User ID A (630) | Accumulated Risk Score (640) |
|---|---|---|---|---|
| User ID A | 20 | -- | 20+10*.2+10*.4+10*.5+10*.6+20*.8 | 55 |
| User ID B | 10 | .2 | 10+20*.2 | 14 |
| User ID C | 10 | .4 | 10+20*.4 | 18 |
| User ID D | 10 | .5 | 10+20*.5 | 20 |
| User ID E | 10 | .6 | 10+20*.6 | 22 |
| User ID F | 20 | .8 | 20+20*.8 | 36 |

| 650 | Accum. Risk Score | Correlation to User ID B | Accumulated Risk Score Computations Relative to User ID B | Accumulated Risk Score |
|---|---|---|---|---|
| User ID A | 55 | .2 | Already computed above | 55 |
| User ID B | 14 | -- | 14+18*.4+20*.2+22*.1+36*.6 | 49 |
| User ID C | 18 | .4 | 18+14*.4 | 23.6 |
| User ID D | 20 | .2 | 20+14*.2 | 22.8 |
| User ID E | 22 | .1 | 22+14*.1 | 23.4 |
| User ID F | 36 | .6 | 36+14*.6 | 44.4 |

| ... | ... | ... | ... |
|---|---|---|---|

*Fig. 6*

CLOUD-BASED ANALYTICS TO MITIGATE ABUSE FROM INTERNET TROLLS

BACKGROUND

Online communities may experience online harassment from Internet 'trolls.' An Internet troll is a malicious user who intentionally provokes arguments and upsets users by posting inflammatory, extraneous, or off-topic messages in an online community such as a newsgroup, forum, chat room, or blog. Internet trolls, in turn, typically generate widespread cases of harassment and abusive language that lead many people feeling uncomfortable to speak out online.

Internet trolls may work alone or in groups, and typically create several different accounts to post offensive messages in an effort to be "under the radar" of an administrator searching for user accounts that post an excessive amount offensive messages. In addition, Internet trolls may target specific individuals and post offensive messages pertaining to the specific individuals on several different discussion boards of which the specific individuals are members.

BRIEF SUMMARY

According to one embodiment of the present disclosure, an approach is provided in which an information handling system creates a first language profile corresponding to a first user account in response to determining that the first user account generated a first offensive message. The information handling system computes an accumulated risk score of the first user account based on correlating the first language profile to a second language profile corresponding to a second user account that generated a second offensive post. The accumulated risk score is based on a first risk score of the first user account and a second risk score of the second user account. In turn, the information handling system generates a notification in response to determining that the accumulated risk score reaches a risk threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting user account risk scores increasing as their corresponding language profiles correlate to other user account language profiles;

DETAILED DESCRIPTION

Figure 1:
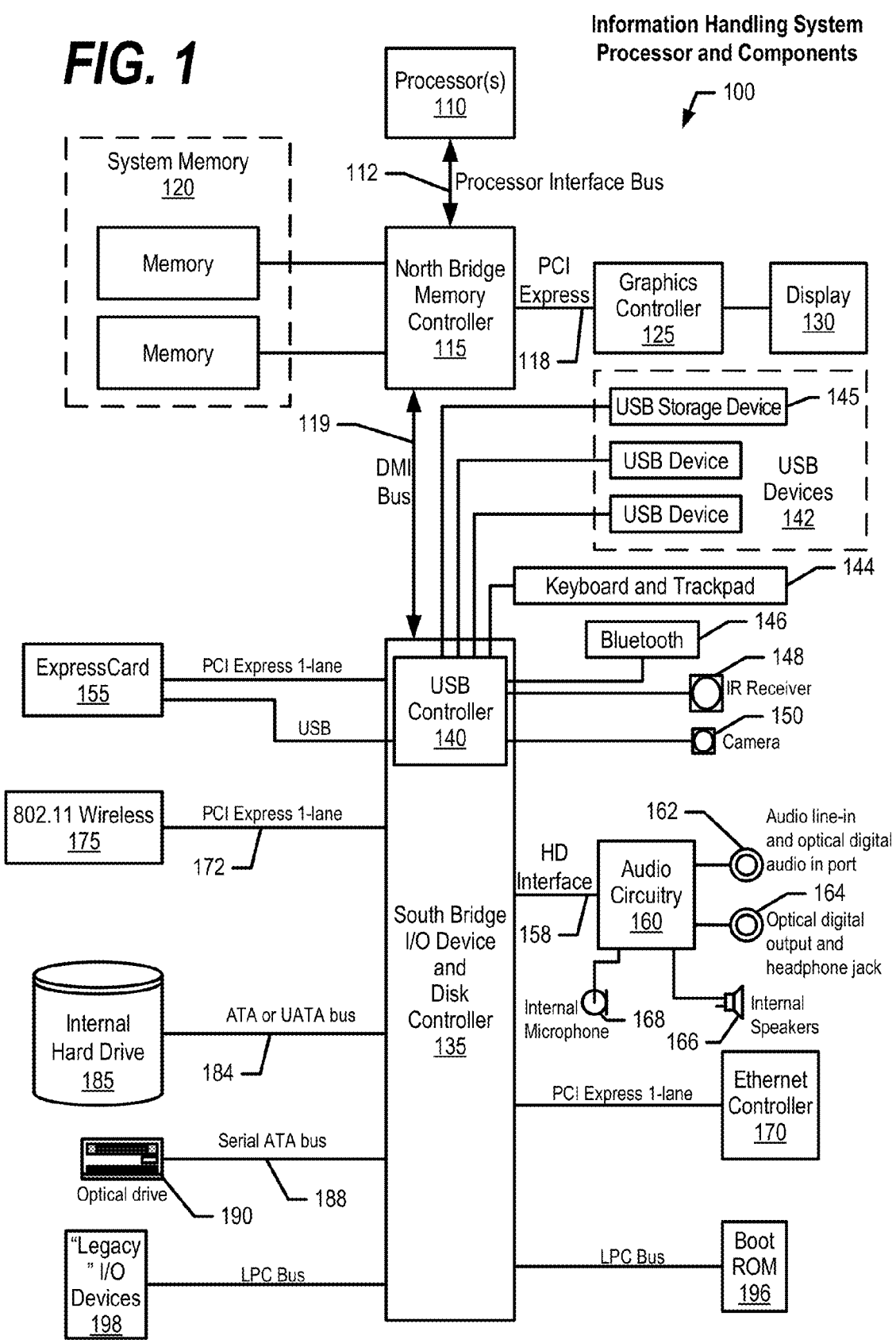
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge.

Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
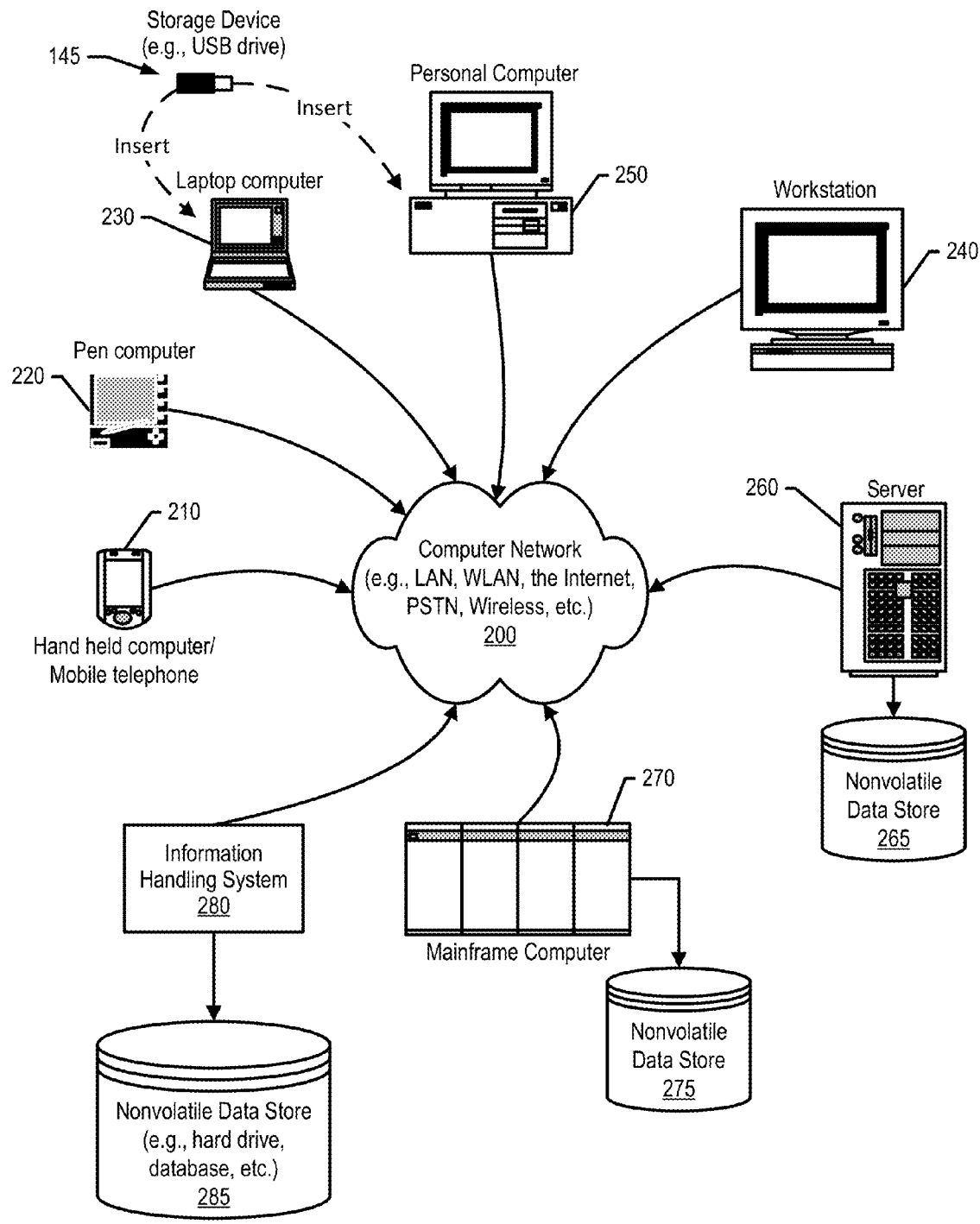
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 8 depict an approach that can be executed on an information handling system. As discussed earlier, Internet trolls may be difficult to identify because they typically generate messages, also referred to herein as posts, on multiple sites using multiple user accounts. To solve this dilemma, the information handling system described herein uses analytics to identify aggressive/abusive language in posts, assess their similarity with posts from other user accounts on other forums, and computes accumulated risk scores based on their similarity. In turn, when a user account's accumulated risk score reaches a threshold, the information handling system generates a notification and, if authorized, suspends the user account.

Figure 3:
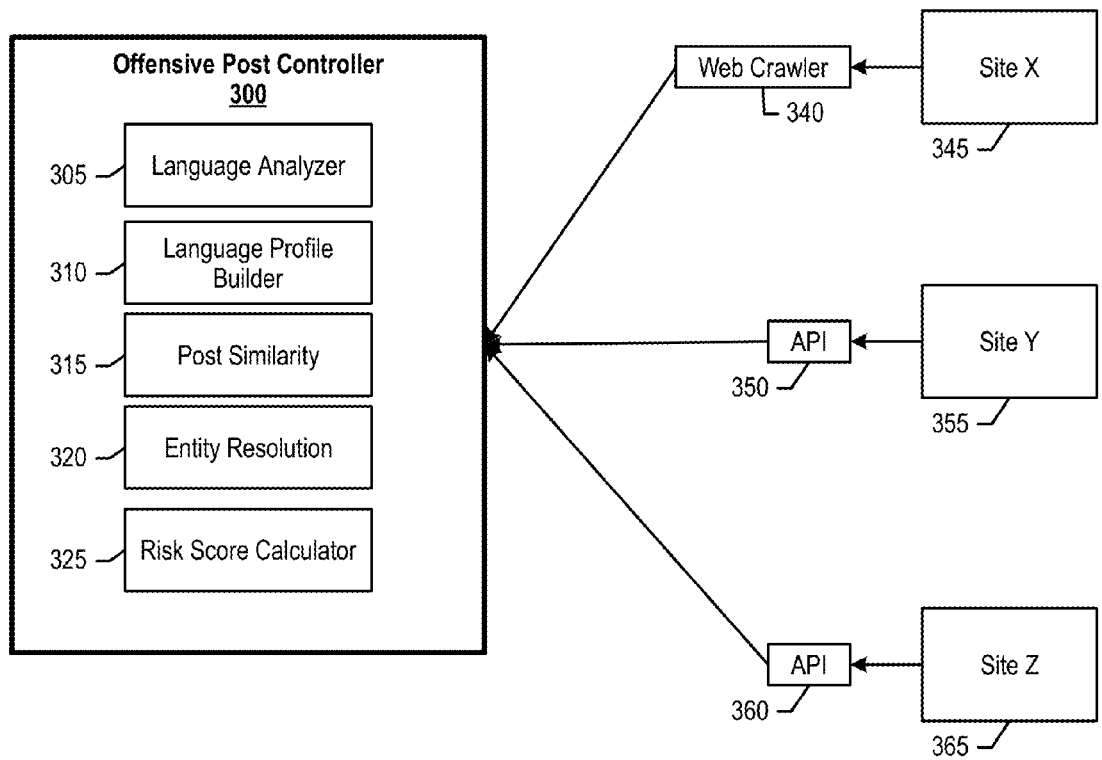
FIG. 3 is an exemplary diagram depicting an offensive post controller that computes user risk scores based on correlating offensive posts generated from different user identifiers.

FIG. 3 is an exemplary diagram depicting an offensive post controller that computes user risk scores based on correlating offensive posts generated from different user accounts. Offensive post controller 300 monitors site X 345, site Y 355, and site Z 365 for offensive posts that are generated by various users. Offensive post controller 300 may use web crawler 340 and/or application programming interfaces (APIs) 350 and 360 to access information from in the various sites. For example, site X 345 may host a variety of forums and/or discussion boards in which web crawler 340 detects new posts and sends the new posts to offensive post controller 300 for analysis. Likewise, site Y 355 and site z 365 may be social media sites that provide APIs 350 and 360, respectively. As such, offensive post controller 300 interfaces to the APIs to receive new posts for analysis. As those skilled in the art can appreciate, offensive post controller 300 may monitor more or less sites than what FIG. 3 depicts.

Offensive post controller 300 receives a new post from web crawler 340, API 350, or API 360, and performs content/sentiment analysis on the post using language analyzer 305. For example, language analyzer 305 may perform natural language processing steps on the new post to identify the post's context, sentiment, inappropriate words or phrases, etc. In one embodiment, offensive post controller 300 may use language analyzer 305 to analyze subsequent comments corresponding to the post. For example, a subsequent comment may comment on the offensiveness of the new post instead of the actual discussion subject.

Based on the analysis, offensive post controller 300 determines whether the post is offensive. In one embodiment, offensive post controller 300 is trained on training data to identify offensive words, sentences and language patterns. In this embodiment, offensive post controller 300 identifies a post containing a collection of words/phrases that the system has previously recognized as offensive and/or may be followed by a collection of responses to the offensive post When offensive post controller 300 determines an offensive post, offensive post controller 300 flags the user account (e.g., user identifier (ID)) that generated the post and analyzes the history of posts generated from the flagged user account via language profile builder 310 to generate a language profile for the user account. Offensive post controller 300 also generates a risk score of the flagged user account via risk score calculator 325 based on, for example, the offensiveness of the posts and whether the user account is linked to other offensive posts.

Offensive post controller 300 then uses post similarity 315 and/or entity resolution 320 to expand the search for user accounts having similar language profiles, such as similar patterns in language, phrasing, username similarity, typical time of posts etc., indicating that a same malicious user is generating offensive posts using different user accounts (e.g., username, name, etc.). In one embodiment, offensive post controller 300 evaluates user account language profiles from the same site and then expands its search to other sites. For example, if offensive post controller 300 determined an offensive post at site X 345, offensive post controller 300 may compare the language profile linked to the user account that generated the post to other language profiles linked to other user accounts in site X 345. Then, or in parallel, offensive post controller 300 may compare the language profile linked to the flagged user account to other language profiles linked to other user accounts in site Y 355 and site Z 365.

When offensive post controller 300 correlates a different user account with the flagged user account, offensive post controller 300 may increase the risk score of both user accounts accordingly. For example, user ID A may have a risk score of 30 and user ID B may have a risk score of 10 and have a 50% correlation to user ID A. In this example, offensive post controller 300 may multiply the risk scores of the correlated user ID's by the correlation percentage and add it to their respective user account risk score to compute accumulated risk scores for each user account:

UserAcct$A$=UserAcct$A$ Risk score+UserAcct$B$ Risk Score*Correlation=30+10*0.5=35 (accumulated risk score)

UserAcct$B$=UserAcct$B$ Risk score+UserAcct$A$ Risk Score*Correlation=10+30*0.5=25 (accumulated risk score)

Offensive post controller 300 then determines if either of the user account accumulated risk scores reach the risk score threshold. If one or both user account risk scores reach the risk score threshold, offensive post controller 300 performs an action such as informing a forum moderator or, if given administration privileges, suspend the accounts for review, and may also temporary remove the offensive posts. In one embodiment, offensive post controller 300 may lock accounts and users may be forced to confirm that the users are not the same person using a date of birth (or similar) in order to re-activate their account and possibly reverse the increase in their risk score. As those skilled in the art can appreciate, offensive post controller 300 may use more complex, statistical approaches to compute accumulated risk scores instead of using the approach shown above.

Offensive post controller 300 proceeds to evaluate user ID language profiles from other sites, compute user ID accumulated risk scores, and perform actions as required to prevent a user from spreading offensive posts across a wide spectrum of platforms.

Figure 4:
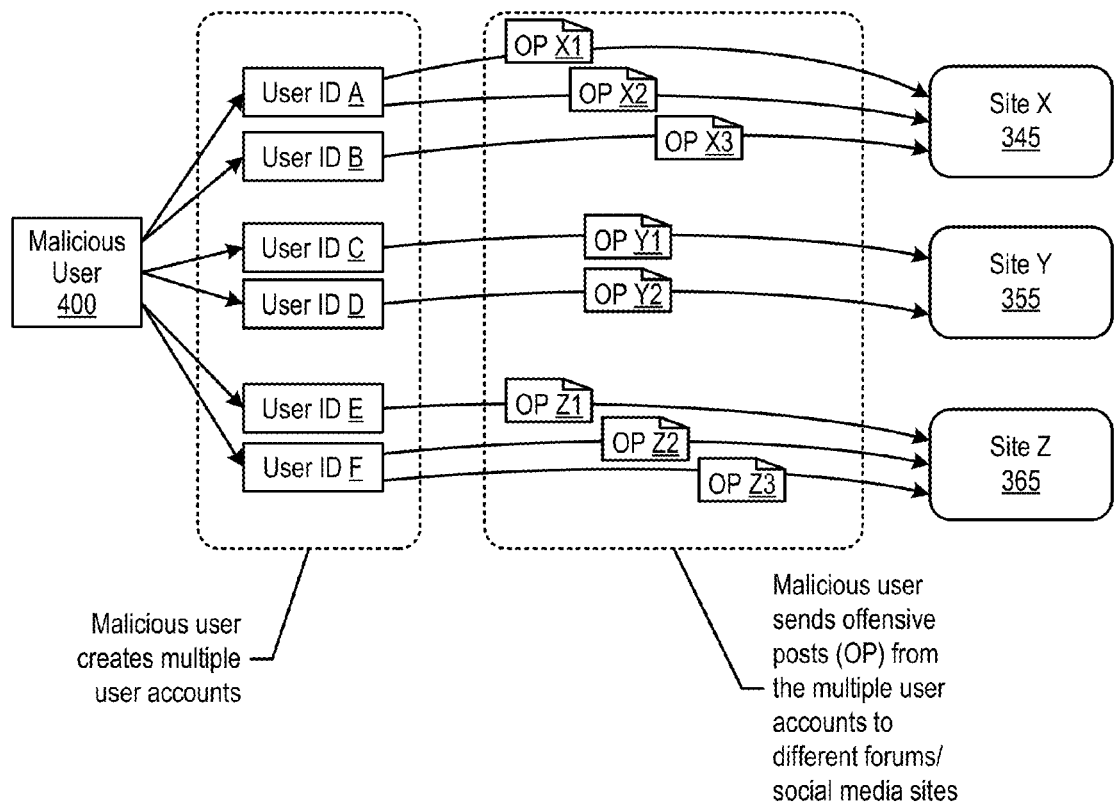
FIG. 4 is an exemplary diagram depicting a malicious user creating multiple accounts and generating multiple offensive posts across multiple sites.

FIG. 4 is an exemplary diagram depicting a malicious user creating multiple accounts (user ID's) and generating multiple offensive posts across multiple sites. Malicious user 400 creates user ID A and user ID B for site X 345; creates user ID C and user ID D for site Y 355; and creates user ID E and user ID F for site Z 365.

Malicious user 400 uses the established accounts to post offensive posts on their respective sites. Regarding site X 345, the example shown in FIG. 4 shows that offensive post (OP) X1 and X2 were generated using user ID A and offensive post X3 was generated using user ID B. Regarding site Y 355, offensive post Y1 was generated using user ID C and offensive post Y2 was generated using user ID D. Regarding site Z 365, offensive post Z1 was generated using user ID E and offensive post Z2 and Z3 were generated using user ID F. As a result, malicious user 400 generates several malicious posts across several sites using several user IDs and, therefore, any one user ID may not be flagged using traditional approaches to identify Internet trolls.

However, as discussed herein, when offensive post controller 300 detects an offensive post, offensive post controller 300 correlates the offensive posts corresponding user account language profile with other user account language profiles at the same site and across other sites to obtain a broad view of the malicious user's patterns. As such, offensive post controller 300 correlates the user account language profiles of the user ID's shown in FIG. 4 and increases their accumulated risk scores based on their correlation with each other (see FIG. 6 and corresponding text for further details). In turn, their accumulated risk scores reach a risk score threshold at a faster pace and offensive post controller 300 performs actions accordingly, such as informing forum moderators and/or suspending malicious user 400's accounts.

Figure 5:
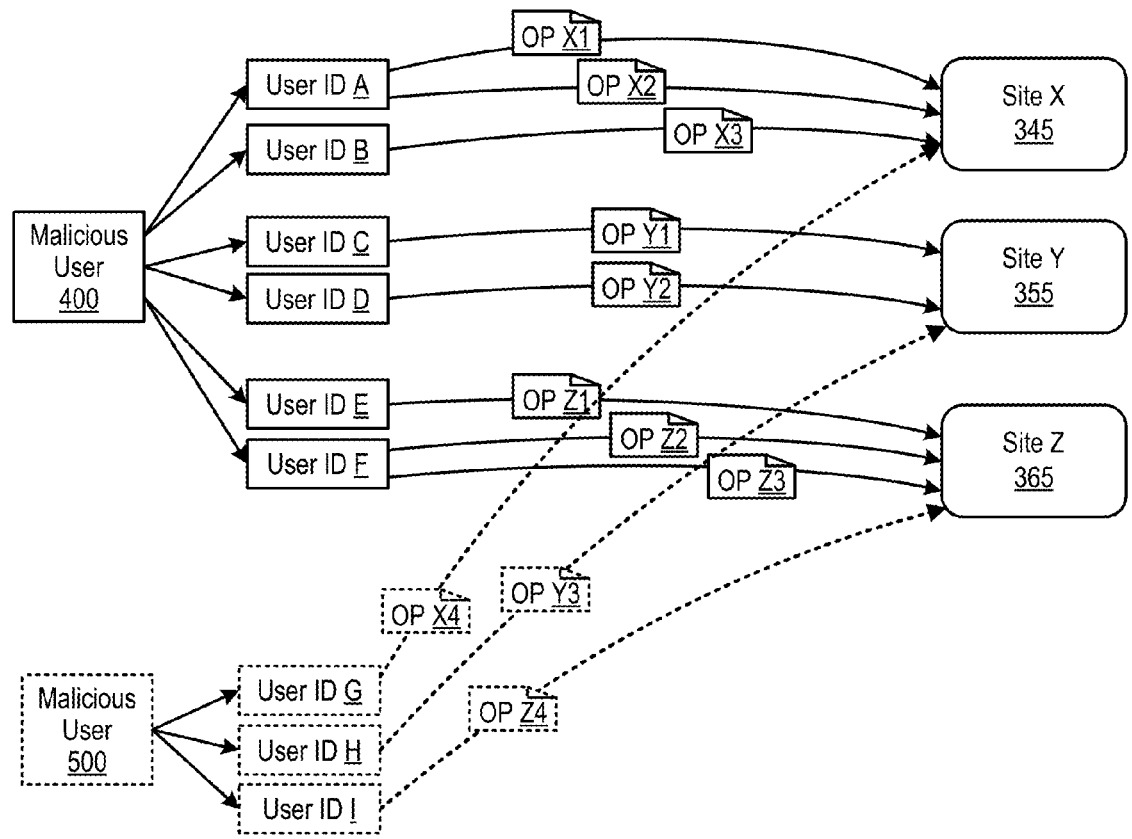
FIG. 5 is an exemplary diagram depicting malicious users working as a group to generate multiple offensive posts using multiple user ID's across multiple sites.

FIG. 5 is an exemplary diagram depicting malicious users working as a group to generate multiple offensive posts using multiple user ID's across multiple sites. In one embodiment, malicious user 400 may conspire with malicious user 500 to attack users and/or sites. In this embodiment, malicious user 500 may generate user ID's G, H, and I for sites X 345, Y 355, and Z 365, respectively. Then, malicious user 500 posts offensive posts X4, Y3, and Z4 on their respective sites in unison with malicious user 400's offensive posts. In this embodiment, offensive post controller 300 may determine that malicious user 400 and malicious user 500 are targeting the same victim and increasing their risk scores accordingly to a point at which actions are taken.

FIG. 6 is an exemplary diagram showing user ID risk scores increasing as their corresponding language profiles correlate to other user ID language profiles. As those skilled in the art will appreciate, FIG. 6 shows an example of a simple implementation to compute risk scores, and offensive post controller 300 may use more sophisticated statistical tools and weightings to compute the risk scores. Table 600 shows initial risk scores that are computed for each user account (user ID shown in column 610). Referring to FIG. 4, each user ID received "10" risk score points for each offensive post (assuming that each post is at the same "offensiveness level").

Column 620 shows the level at which the other user ID language profiles are correlated to user ID A's language profile. These correlations are used to compute accumulated risk scores for each of the user ID's shown in column 630. Table 600's column 630 shows that offensive post controller 300 computes user ID A's accumulated risk score based on the correlations to each of the other user ID language profiles, and computes the other user ID's accumulated risk score based on its respective correlation to user ID A (shown in column 640).

Offensive post controller 300 then moves to user ID B (table 650) and computes user ID B's accumulated risk score based on the correlations to each of the other user ID language profiles. Offensive post controller 300 also computes the other user ID's accumulated risk score based on its respective correlation to user ID B. Offensive post controller 300 proceeds through correlating user IDs and adjusting risk scores until each of the user ID's accumulated risk scores are computed based on the each of the correlated user IDs. Offensive post controller 300 then determines which of the accumulated risk scores reach the risk score threshold and take actions against the accounts of the user IDs accordingly (see FIGS. 7, 8, and corresponding text for further details).

Figure 7:
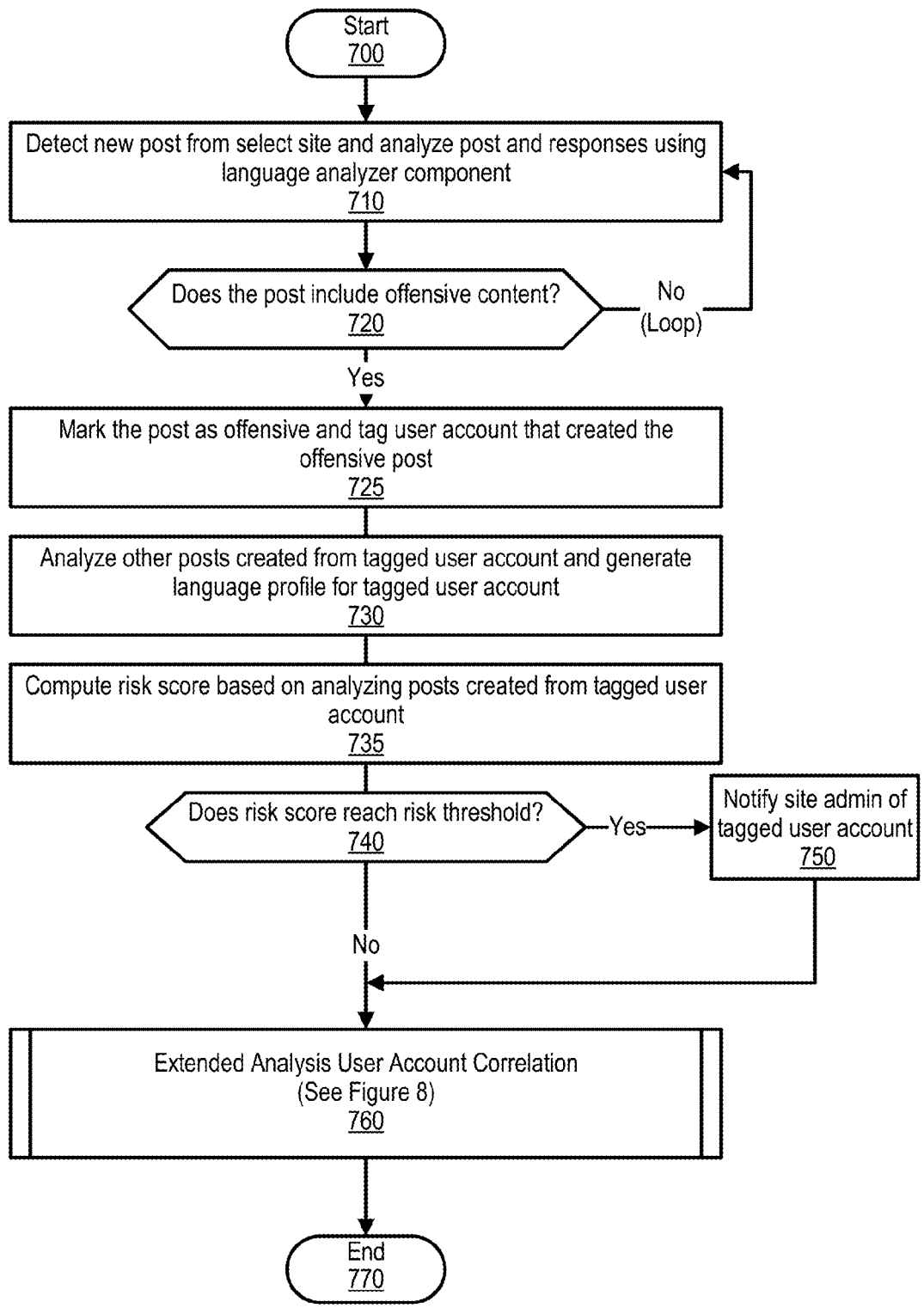
FIG. 7 is an exemplary flowchart depicting steps taken by an information handling system to detect offensive posts and adjust user account risk scores accordingly.

FIG. 7 is an exemplary flowchart depicting steps taken by an information handling system to detect offensive posts and adjust user account risk scores accordingly. FIG. 7 processing commences at 700 whereupon, at step 710, the process detects a new post that is posted on a selected site. The process analyzes the post and, in one embodiment, also analyzes subsequent responses to the posts.

The process determines as to whether the post includes offensive content based on the analysis (decision 720). If the post does not include offensive content, or if the subsequent posts do not indicate that the post is offensive, then decision 720 branches to the 'no' branch which loops back to monitor other posts that are posted on the site. This looping continues until the process determines that a new post includes offensive content, at which point decision 720 branches to the 'yes' branch exiting the loop.

At step 725, the process marks the post as offensive and identifies the user account that created the offensive post. At step 730, the process analyzes other posts created from the user account (both offensive and non-offensive) and generates a language profile for the user account. At step 735, the process computes a risk score for the user account based on the analysis of the posts generated from the user account.

The process determines as to whether the computed risk score reaches a risk threshold (decision 740). If the risk score reaches the risk threshold, then decision 740 branches to the 'yes' branch whereupon, at step 750, the process notifies the site administrator of the user account that reached the risk threshold. In one embodiment, the process may have authority to suspend the user's account until a system administrator evaluates the offensive posts. On the other hand, if the risk score does not reach the risk score threshold, then decision 740 branches to the 'no' branch.

Figure 8:
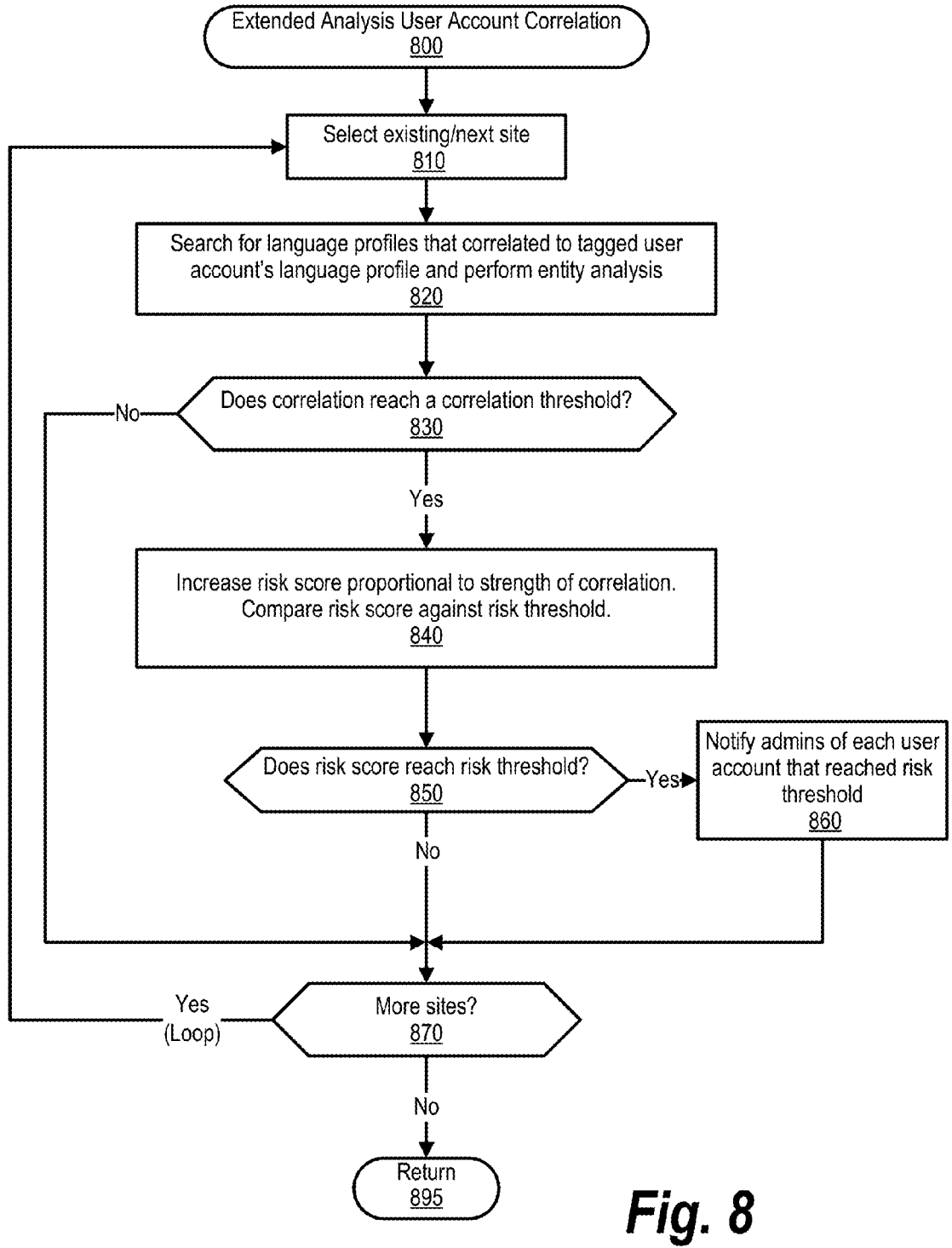
FIG. 8 is an exemplary diagram depicting steps taken by an information handling system to analyze a user's language profile against language profiles from other sites to determine a correlation and adjust risk scores accordingly.

At predefined process 760, the process searches for other user accounts (from the same site as well different sites) that correlate to the tagged user account and adjusts risk scores accordingly (see FIG. 8 and corresponding text for processing details). FIG. 7 processing thereafter ends at 770.

FIG. 8 is an exemplary diagram depicting steps taken to analyze a user's language profile against language profiles from other sites to determine correlations and adjust risk scores accordingly. FIG. 8 processing commences at 800 whereupon, at step 810, the process selects the same site on which the tagged user account was identified in FIG. 7. At step 820, the process searches the selected site for language profiles that correlate to the tagged user account's language profile and performs entity analysis on the correlated user accounts. For example, the tagged user account may have a username 'JannyBs' that commonly uses the word 'absolutely' and generally posts at night and the process determines a high correlation score with another user account with a username of 'JannyBbs' that also commonly uses the word 'absolutely' and posts at night. As those skilled in the art can appreciate, the process may use other approaches to correlate information corresponding to the tagged user account to information from other user accounts.

The process determines as to whether any user accounts and their corresponding language profiles reach a correlation threshold when compared to the tagged user account from FIG. 7 (decision 830). If any accounts and their corresponding language profiles do not reach the correlation threshold, then decision 830 branches to the 'no' branch. On the other hand, if users/user IDs and their corresponding language profiles reach a correlation threshold, then decision 830 branches to the 'yes' branch.

At step 840, the process increases the risk score of each user account (both tagged user account and correlated user account) proportional to the strength of the correlation (see FIG. 6 and corresponding text for further details). The process then compares the increased risk scores of each of the user accounts against the risk threshold and determines whether any of the increased risk scores reach the risk threshold (decision 850). If at least one of the risk scores reaches the risk threshold, then decision 850 branches to the 'yes' branch whereupon, at step 860, the process notifies the administrators of the sites of each user account that reached the risk threshold. As discussed above, the process may also have authority to suspend the user accounts that reached the risk threshold.

On the other hand, if the risk scores do not reach the risk threshold, then decision 850 branches to the 'no' branch. The process determines as to whether there are more sites to analyze (decision 870). For example, referring to FIG. 3, the tagged user account may have posted an offensive post on site X 345 and the process then turns to site Y 355 to search for user account language profiles that correlate to the tagged user account's language profile. In this example, site Y 355 may have a user account with a username of 'JannyBbz' that frequently uses the phrase 'positively' and has a strong correlation with the user account of 'JannyBs' from site X 345 discussed above.

If there are more sites to analyze, then decision 870 branches to the 'yes' branch which loops back to select the next site and search for correlating language profiles. This looping continues until there are no more sites to analyze, at which point decision 870 branches to the 'no' branch exiting the loop. FIG. 8 processing thereafter returns to the calling routine (see FIG. 7) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   performing, by the processor, natural language processing analysis on a first message received over a computer network and generated by a first social media user account;
   determining, by the processor and based on the natural language processing analysis, that the first message includes a first set of offensive content;
   creating, by the processor, a first language profile corresponding to the first social media user account in response to determining that the first message includes the first set of offensive content;
   computing, by the processor, a correlation percentage between the first social media user account and a second social media account, wherein the computing of the correlation percentage further comprises:
      matching a first posting time of the first message to a second posting time of a second message generated from the second social media account; and
      determining that the second message includes one or more language patterns that are also included in the first message, wherein the one or more language patterns are different from the set of offensive content;
   computing, by the processor, an accumulated risk score of the first social media user account based on a first risk score corresponding to the first social media user account, a second risk score corresponding to the second social media user account, and the correlation percentage; and
   generating a notification in response to determining that the accumulated risk score reaches a risk threshold.

2. The method of claim 1 further comprising:
   collecting a set of messages generated from the first social media user account;
   identifying the one or more language patterns in response to analyzing both the first message and the set of messages; and
   including the one or more language patterns in the first language profile.

3. The method of claim 1 further comprising:
   performing natural language processing analysis on a set of subsequent messages that were posted in response to the first message being posted;
   determining, based on the natural language processing analysis of the set of subsequent messages, that the set of subsequent messages includes one or more indications that the first message is offensive; and
   factoring the one or more indications from the set of subsequent messages into the determination that the first message includes the set of offensive content.

4. The method of claim 1 further comprising:
   suspending the first social media user account in response to determining that the accumulated risk score reaches the risk threshold.

5. The method of claim 1 wherein the first social media user account and the first message correspond to a first online forum, and wherein the second social media user account and the second message correspond to a second online forum that is different than the first online forum.

6. The method of claim 5 wherein the first social media user account and the second social media user account correspond to a same malicious user.

7. The method of claim 5 further comprising:
   receiving the first message from the first online forum through a first application program interface (API); and
   receiving the second message from the second online forum through a second application API.

8. An information handling system comprising:
   one or more processors;
   a memory coupled to at least one of the processors;
   a set of computer program instructions stored in the memory and executed by at least one of the processors in order to perform actions of:
      performing natural language processing analysis on a first message received over a computer network and generated by a first social media user account;
      determining, based on the natural language processing analysis, that the first message includes a first set of offensive content;
      creating a first language profile corresponding to the first social media user account in response to determining that the first message includes the set of offensive content;
      computing, by the processor, a correlation percentage between the first social media user account and a second social media account, wherein the computing of the correlation percentage further comprises:
         matching a first posting time of the first message to a second posting time of a second message generated from the second social media account; and
         determining that the second message includes one or more language patterns that are also included in the first message, wherein the one or more language patterns are different from the set of offensive content;
      computing, by the processor, an accumulated risk score of the first social media user account based on a first risk score corresponding to the first social media user account, a second risk score corresponding to the second social media user account, and the correlation percentage; and generating a notification in response to determining that the accumulated risk score reaches a risk threshold.

9. The information handling system of claim 8 wherein the one or more processors perform additional actions comprising:
collecting a set of messages generated from the first social media user account;
identifying the one or more language patterns in response to analyzing both the first message and the set of messages; and
including the one or more language patterns in the first language profile.

10. The information handling system of claim 8 wherein the one or more processors perform additional actions comprising:
performing natural language processing analysis on a set of subsequent messages that were posted in response to the first message being posted;
determining, based on the natural language processing analysis of the set of subsequent messages, that the set of subsequent messages includes one or more indications that the first message is offensive; and
factoring the one or more indications from the set of subsequent messages into the determination that the first message includes the set of offensive content.

11. The information handling system of claim 8 wherein the one or more processors perform additional actions comprising:
suspending the first social media user account in response to determining that the accumulated risk score reaches the risk threshold.

12. The information handling system of claim 8 wherein the first social media user account and the first message correspond to a first online forum, and wherein the second social media user account and the second message correspond to a second online forum that is different than the first online forum.

13. The information handling system of claim 12 wherein the first social media user account and the second social media user account correspond to a same malicious user.

14. The information handling system of claim 12 wherein the one or more processors perform additional actions comprising:
receiving the first message from the first online forum through a first application program interface (API); and
receiving the second message from the second online forum through a second application API.

15. A computer program product stored in a computer readable storage medium, comprising computer program code that, when executed by an information handling system, causes the information handling system to perform actions comprising:
performing natural language processing analysis on a first message received over a computer network and generated by a first social media user account;
determining, based on the natural language processing analysis, that the first message includes a first set of offensive content; creating a first language profile corresponding to the first social media user account in response to determining that the first message includes the first set of offensive content;
computing, by the processor, a correlation percentage between the first social media user account and a second social media account, wherein the computing of the correlation percentage further comprises:
matching a first posting time of the first message to a second posting time of a second message generated from the second social media account; and
determining that the second message includes one or more language patterns that are also included in the first message, wherein the one or more language patterns are different from the set of offensive content;
computing, by the processor, an accumulated risk score of the first social media user account based on a first risk score corresponding to the first social media user account, a second risk score corresponding to the second social media user account, and the correlation percentage; and
generating a notification in response to determining that the accumulated risk score reaches a risk threshold.

16. The computer program product of claim 15 wherein the information handling system performs further actions comprising:
collecting a set of messages generated from the first social media user account;
identifying the one or more language patterns in response to analyzing both the first message and the set of messages; and
including the one or more language patterns in the first language profile.

17. The computer program product of claim 15 wherein the information handling system performs further actions comprising:
performing natural language processing analysis on a set of subsequent messages that were posted in response to the first message being posted;
determining, based on the natural language processing analysis of the set of subsequent messages, that the set of subsequent messages includes one or more indications that the first message is offensive; and
factoring the one or more indications from the set of subsequent messages into the determination that the first message includes the set of offensive content.

18. The computer program product of claim 15 wherein the information handling system performs further actions comprising:
suspending the first social media user account in response to determining that the accumulated risk score reaches the risk threshold.

19. The computer program product of claim 15 wherein the first social media user account and the first message correspond to a first online forum, and wherein the second social media user account and the second message correspond to a second online forum that is different than the first online forum.

20. The computer program product of claim 19 wherein the first social media user account and the second social media user account correspond to a same malicious user.

* * * * *